United States Patent [19]

Jarrell

[11] Patent Number: 4,815,086
[45] Date of Patent: Mar. 21, 1989

[54] LASER PULSE MODULATOR

[75] Inventor: Lester L. Jarrell, Lakeside, Calif.

[73] Assignee: Chemtronics, El Cajon, Calif.

[21] Appl. No.: 26,395

[22] Filed: Mar. 16, 1987

[51] Int. Cl.$^4$ .............................................. H01S 3/00
[52] U.S. Cl. ........................................ 372/38; 372/31
[58] Field of Search ...................... 372/9, 25, , 26, 29, 372/38, 28, 31; 219/121 E, 121 E; 307/260–261, 498, 529, 265, 264; 328/28, 22, 32, 142–143, 158

[56] References Cited

U.S. PATENT DOCUMENTS

| | | | |
|---|---|---|---|
| 3,406,347 | 10/1968 | Young | 328/143 |
| 3,515,938 | 4/1968 | Morse | 372/38 |
| 4,347,610 | 8/1982 | Meuleman | 372/29 |
| 4,634,892 | 1/1987 | Isbell et al. | 307/265 |

FOREIGN PATENT DOCUMENTS 2414851 10/1975 Fed. Rep. of Germany ...... 328/142

Primary Examiner—William L. Sikes
Assistant Examiner—Randolph B.
Attorney, Agent, or Firm—Frank D. Gilliam

[57] ABSTRACT

The invention is directed to the power control of a gas laser being moved by a prime mover along at least two different axes at various speeds to provide effectively constant output power to the workpiece surface. Signals from the prime mover axis representative of the speed of movement of each axis are separately rectified then summed and modulated with a positively offset triangular wave signal. The resulting output signal is a composite width modulated square wave pulse representative of the instantaneous laser output power required to maintain an effective constant power to the workpiece at various speeds and directions of movement of the laser.

3 Claims, 1 Drawing Sheet

LASER PULSE MODULATOR

BACKGROUND OF THE INVENTION

The invention is directed to laser power output control and more particularly to a circuit to provide an effectively constant laser power output at the workpiece during movement of the laser along at least two different axes at various different speeds.

Pulsed gas lasers have found many and various uses in modern manufacturing processes. Such uses include but are not limited to the cutting of material such as metal, plastic and the like, the milling of metal, etc. These gas lasers are controlled by switching means driven by square wave pulses for repetitively energizing the pulsed laser discharge tube at a predetermined frequency by selectively providing a current path through the discharge tube. Selecting the switching frequency for laser systems used for cutting material or the like is determined by the speed of the movement along the material and the required power at the workpiece. This speed is substantially constant. When the cutting of material along two axes is required and the axes speeds are not substantially constant the selected frequency of the laser power control may be ideal for one fixed speed of movement and excessive or not sufficient for different speeds of movement. In this situation trial and error methods are used to establish a useable or compromised fixed frequency setting. In the cutting of materials along one axis for example, the trial and error method may be satisfactory; however, when a pulsed laser is used in the milling of material and is required to travel along two or more axes excessive or insufficient power at the workpiece cannot be tolerated for accurate milling. Ideally, the material being milled effectively receives constant power from the laser at changing speeds of movement of the various axes of the laser along the material. This insures the expected degree of milling of the material at all times. There has not been a satisfactory means of controlling the output power of a pulsed gas laser simultaneously moved along two or more axes at changing speeds until the emergency of the instant invention.

SUMMARY OF THE INVENTION

The above and other disadvantages are overcome by the instant invention that provides means for continually varying the output power of a pulsed gas laser which is directly related to the composite of the continually varying speeds of movement along two or more axes of direction.

In the preferred embodiment of the invention the laser's prime mover translates the laser along at least two axes of movement. The prime mover is typically controlled by a computer or the like which is programmed to move the laser to and fro along its various axes of movement at various speeds. For example, for milling machines, the laser may simultaneously be moved along five different axes of movement each at different speeds. Different amounts of material may be required to be removed from the workpiece at various locations along any of the axes of movement of the laser requiring the laser to be continually moved slower or faster along the various axis simultaneous while providing a substantially constant effective power from the laser at the material surface.

The laser power modulator of the invention accomplishes this by producing a variable width square wave signal for switching the laser on and off which is a composite of the actual instantaneous speeds of the various axes of laser movement. The instantaneous speeds of an individual axis is provided from a tachometer associated with each axis of the prime mover. The wave form signal from each tachometer has a distorted sinusoidal shape. These wave form signals from each axis of movement are amplitude adjusted to substantially the same level. Each of these signals is separately rectified and then summed together at a common summining point. This summed signal is then modulated with a triangular wave signal of a fixed frequency and positive base line. The resulting pulse modulated wave signal has pulse width variation directly related to the on and off time of the pulsed gas laser required to maintain an effective constant power level at the workpiece being milled, or the like, during laser axes movement.

Accordingly the object of this invention is to maintain the effective power of the laser beam on the workpiece to accomplish the work desired regardless of the different speeds of at least two or more axes of movement of the laser beam.

Other features and advantages of the invention will be set forth in, or apparent from, the detailed description of a preferred embodiment found herein below.

DETAILED DESCRIPTION OF THE DRAWINGS

Figure 1:
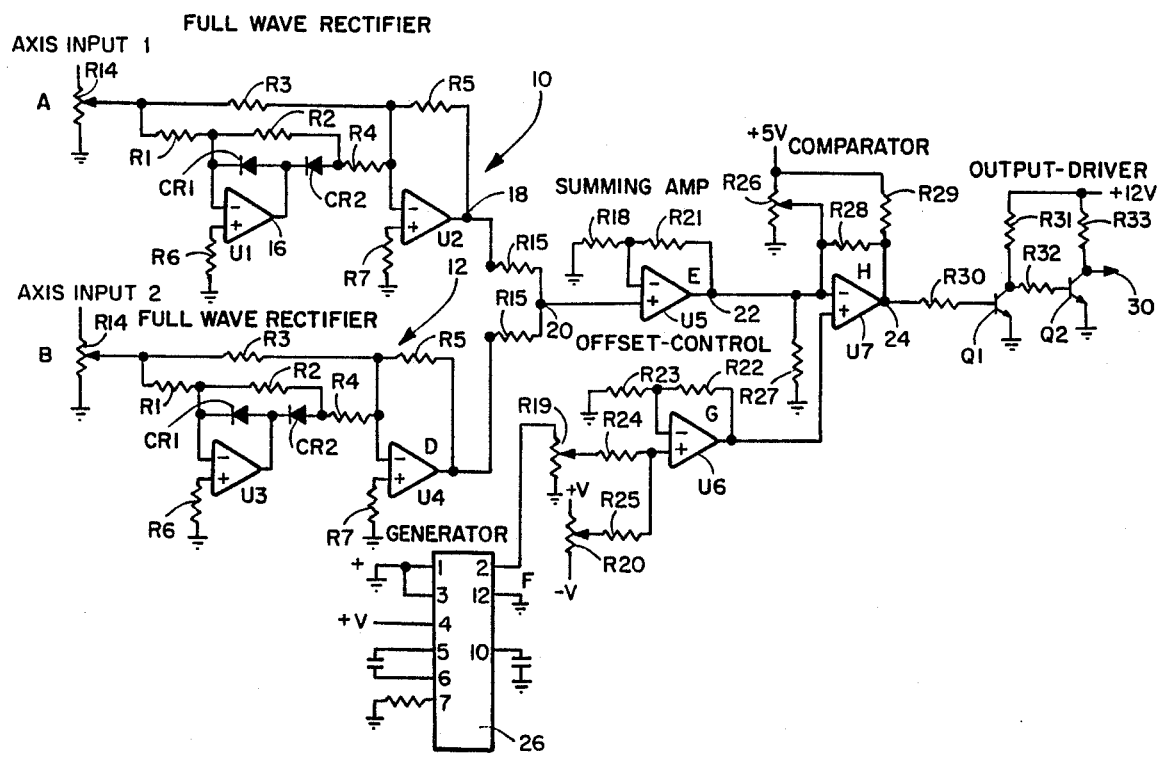
FIG. 1 is a schematic showing of the schematic circuit of the preferred embodiment of the invention and FIG. 2 are the wave forms from various locations in the circuit of FIG. 1.
Figure 2:
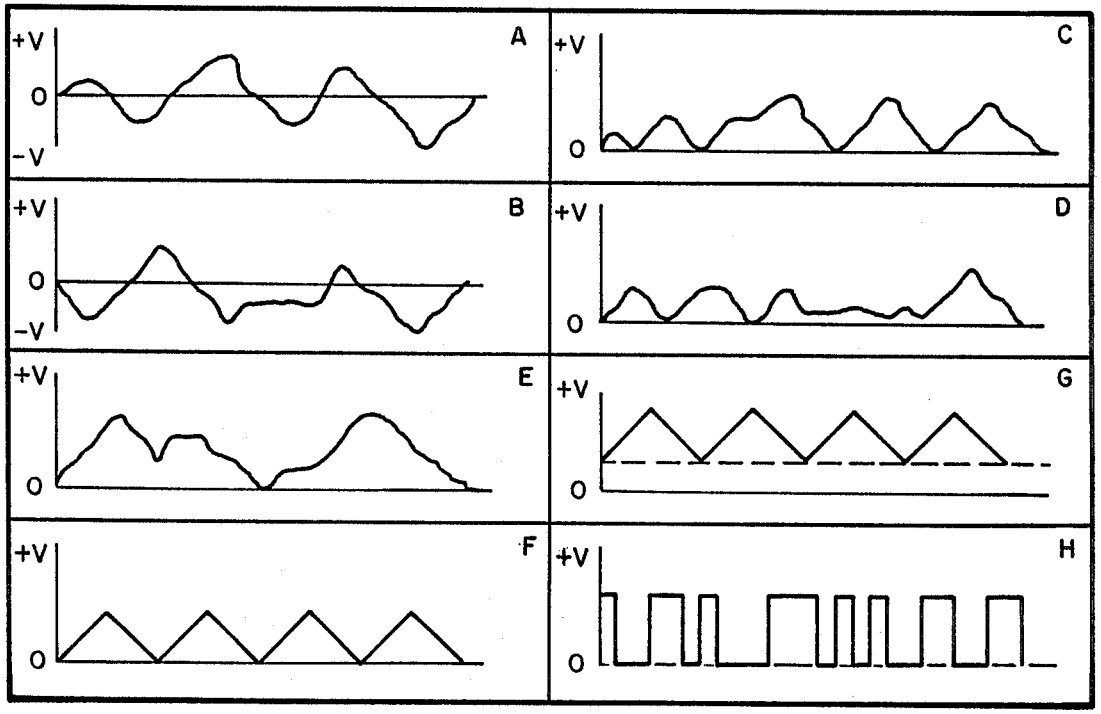

FIG. 1 is a schematic circuit showing of the laser pulse modulator of the present invention and FIG. 2 depicts various wave forms taken at indicated location on the circuit.

The schematic shown is directed to an X and Y axis laser prime mover, namely, a positioning device for a laser having at least a linear axis and a rotary axis. It should be understood that two axes operation is shown for ease of explanation and that additional prime mover axis or axes could be added as will be hereinafter explained in more detail.

Two full wave rectifier circuits 10 and 12 are shown. The input signals A and B to the rectifier circuits represent, for example, a linear and rotary axes laser control and are supplied from the electrical feed back circuit generally the output from a tachometer of a laser prime mover mechanism, not shown. The prime mover, for example, may be a model Allen Bradley 8200 manufactured by Allen Bradley or any equivalent thereto. The typical intaneous shape of these feed back wave forms are shown in FIG. 2.

The signals at A and B represent the electrical equivalent of the varying speed of machine movement of the monitored axis.

Full wave rectifiers 10 and 12 are identical and each have the following components identically interconnected.

The incoming signal A or B is fed into one end of a potentiometer resistor R14. The other end of R14 is connected to common ground potential. The wipers of each are connected to one end of resistors R1 and R3 of 20K ohms. The opposite end of R3 is connected to one end of R4 of 10K ohm, R5 of 20K ohm, and the negative input of operational amplifier U2. The opposite end of R1 is connected to one end of R2 of 20K ohms, the cathode of diode rectifier CR1 and the negative input of operational amplifier V1. The positive inputs of V1 and V2 are connected through resistor R6 and R7 of 10K ohm to common ground potential. The output terminal of operational amplifier V1 is connected to the anode of diode rectifier CR2. The opposite end of resistor R2 is connected to the anode of diode rectifier CR2 and to the other end of R4. The opposite end of R5 is connected to the output 18 of U2 and to one end of a resister R15 of 2.2K ohms. The opposite end of resistor R15 is connected to a common summing point 20.

It should be understood that all of the circuits of the full wave rectifiers which represent movement of a prime mover axis are the same as described above and are all interconnected to the common summing point 20. Although only two full wave rectifiers are shown, any number of axes input signals and similar rectifiers may be connected to common summing point 20 to influence the output signal of the laser pulse modulator of the circuit.

The summed signal from the represented prime mover axes of movement at point 20 is connected to the positive input of operational amplifier U5. Resistor R18 of 20K ohm is connected between the negative input of U5 and common ground potential. Resistor R21 of 20K ohms is connected between the negative input and output 22 of U5.

The output 22 of U5 is connected to the negative input of operational amplifier U7 and to one end of resistor R27 of 5K ohms. The other end of R27 is connected to common ground potential. The negative input of U5 is also connected to one end of resistor R28 of 20K ohms and the wiper of potentiometer resistor R26 of 5K ohms. One end of R26 is connected to a positive 5V DC supply (not shown) and the other end is connected to common ground potential. The opposite end of resistor R28 is connected to one end of resistor R29 of 20K ohm and output 24 of U7.

A triangle wave form generator 26 has its terminals wired as shown with 1 and 3 connected to common ground potential, 4 connected to +12 Volts DC, 5 and 6 interconnected by a capacitor chosen from the manufacturers suggested value for the intended generator use, 7 connected through a resistor chosen in the same manner to common ground potential, 2 is connected to one end of potentiometer resistor R19 of 20K ohms, 12 is connected to common ground potential through a capacitor chosen from the manufacturers specification listing.

The other end of potentiometer resistor R19 is connected to common ground potential. The wiper of R19 is connected to one end of resistor R24 of 5K ohms. The opposite end of R24 is connected to one end of resistor R25 and the positive input to operational amplifier U6. The other end of R25 is connected to the wiper of potentiometer R20 of 20K ohms. One end of R20 is connected to a positive 12 DC volt supply and the other end to a negative −12 DC volt supply.

One end of resistor 23 of 10K ohms and resistor R22 of 10K oh ms are connected to the negative input of operational amplifier U6. The other end of resistor R23 is connected to common ground potential. The other end of resistor R22 is connected to the output 28 of U6. The output 28 of U6 is connected to the positive input of operational amplifier U7.

The output 24 of U7 is connected to one end of resistor R30 of 20K ohms. The other end of resistor R30 is connected to the base of transistor Q1. The emitter of Q1 is connected to common ground potential. The collector of Q1 is connected to one end of resistor R31 of 5K ohms and resistor R32 of 100 ohms. The other end of resistor R31 is connected to one end of resistor R33 of 2.2K ohms and to a positive 12 VDC supply (not shown). The other end of resistor R32 is connected to the base of transistor Q2. The emitter of Q2 is connected to common ground potential. The collector of Q2 is connected to the other end of resistor R33 and provides the laser pulse modulated drive voltage at 30.

The modulated voltage at 30 is connected to a $CO_2$ laser power circuit. For example, a $CO_2$ laser model Versa Lase 150 manufactured by Photon Corp. would have this voltage connected at its external input for modulation. The laser pulse modulator of this invention would not be limited to any specific laser and could be used to drive any equivalent $CO_2$ pulsed laser.

Typically the resistors used are one-quarter watt at ±5% of the indicated values. Generator 26 is a XR2206 GP function generator manufactured by Exar or any equivalent thereto. Operational amplifiers U1, U2, U5 and U6 are ECG 941 M manufactured by Philips ECG or equivalents thereto. Q1 and Q2 are general purpose transistor 2N222A or equivalent.

As hereinafter noted, the circuits for the A and B axes input from the prime mover are identical. It should be further understood that additional circuits of the same configuration can be added between the input end of potentiometer R14 and the summing point 20 for additional prime mover axes as required.

In operation, the signals from the prime mover axes are rectified and summed at point 20. This summed voltage is then amplified by U5 and compared with the offset triangular voltage at U7. The output signal at U7, a pulse modulator square wave, is amplified by Q1 and Q2 and used to modulate the laser in a manner so as to maintain an average effective power from the laser to the workpiece regardless of the traveling axes velocities. As the machine makes various programmed contour cuts the power delivered from the laser beam to the workpiece is effectively constant over a preset power range. In this manner faster axis movements provide increased laser beam power on time and slower axis movements provide less laser beam power on time. Thus the laser power output at the workpiece is effectively constant through a range of different machine axes speeds.

It will be apparent that the embodiment shown is only exampling and that various modifications can be made in construction and arrangement within the scope of the invention as defined in the appended claims.

I claim:

1. A circuit for providing an input voltage signal for controlling the output power of a laser the on time of which is controlled by the on time of a direct current input signal, said laser being translated by transport means relative to work piece along at least two axes of directional movement at unequal speeds in either one or all of said at least two axes of directional movement, said circuit provides an average effective power transfer from the laser to the workpiece regardless of the traveling axes velocities comprising:
    an input signal from each axes of movement of said transport means scaled to represent the speed of that axes of directional movement, each input signal having a varying amplitude sinusoidal wave form;

a rectifying means for rectifying each of the input signals and producing a separate varying amplitude direct current voltage level signal therefrom;

a signal summing means the common input of which is connected to the output of each of the rectifying means for producing a summed output signal of varying voltage amplitude; and means for modulating the summed output signal with a triangular waveform signal for producing a pulse width modulated constant amplitude signal for controlling the on time of said laser which is directly related to the velocities of physical movement of said laser along its axes.

2. The invention as defined in claim 1 additionally comprising a triangular generator and said means for modulating comprises a comparator having a positive and negative input, said negative input is provided from the output of said summing means and said positive input is provided from the output of said triangular generator.

3. The invention as defined in claim 1 wherein said at least two axes of directional movement are vertical and horizontal.

* * * * *